Aug. 13, 1968  R. B. LAY  3,396,928

LEG MOUNTING

Filed July 15, 1966

INVENTOR.
RALPH B. LAY
BY
Trask, Jenkins & Harley
ATTORNEYS

United States Patent Office 3,396,928
Patented Aug. 13, 1968

3,396,928
LEG MOUNTING
Ralph B. Lay, Columbus, Ind., assignor to Hamilton Cosco, Inc., Columbus, Ind., a corporation of Indiana
Filed July 15, 1966, Ser. No. 565,630
3 Claims. (Cl. 248—188.6)

ABSTRACT OF THE DISCLOSURE

A leg mounting comprising a channeled bracket having a base provided with an opening and a pair of side walls have arcuately spaced recesses formed in their lower edges. A pivot pin extends between said walls and through a leg to swingably and slidably interconnect said bracket and leg. A second pin mounted on the leg is connected to said first pin by a spring and is adapted to be received in said recess whereby said leg is releasably lockable in a retracted position with said second pin being received in one pair of said recesses and an extended position with its upper end being received in said base openings and said second pin being received in another pair of recesses.

---

This invention relates to a leg mounting assembly for use on card tables, chairs, or the like.

It is an object of the invention to provide a leg mounting assembly for mounting a leg on a table, chair, or the like, which will permit said leg to be easily moved between an extended operative position and a retracted position, which will guide the movements of said leg between its operative and retracted positions, which will provide extended support for said leg in its operative and retracted positions, and which will releasably lock said leg in its operative and retracted positions.

In accordance with one form of the invention, there is provided a generally U-shaped bracket carried on a plate having an opening formed therein and adapted to be mounted on a table, chair, or the like. Said bracket is provided with a pair of side walls interconnected at one of their ends by an end wall and having their opposite ends open with curved edges. Pairs of transversely aligned, arcuately spaced recesses are formed in the curved ends of said side walls.

A pivot pin interconnects said pair of side walls, and a leg has one of its ends received between said side walls and is swingably and slidably mounted on said pivot pin. A second pin is mounted on said leg to slide along the curved ends of the side walls and for reception in said recesses. A spring is connected to said pivot pin and second pin to urge said scond pin into said recesses for thus releasably locking the leg in its different positions of adjustment.

To move said leg from its retracted position, it is slid outwardly with respect to the side walls on said pivot pin to disengage said second pin from one pair of the recesses. The leg is then swung about the axis of the pivot pin until said second pin is received in the other pair of recesses and the end of said leg is received in the opening in the plate carrying the bracket. In this manner, the leg will be releasably locked in an extended operative position by its end being received in the opening in said plate and said second pin being received in the second pair of recesses formed in the ends of the side walls.

Other objects and features of the invention will become apparent from the more detailed description which follows and from the accompanying drawings, in which.

Figure 1:
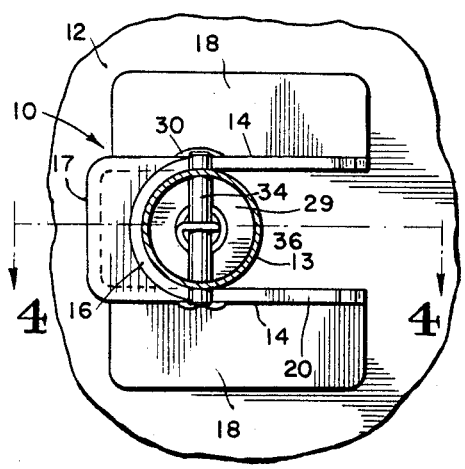
FIG. 1 is a horizontal section taken on the line 1—1 of FIG. 2.
Figure 2:
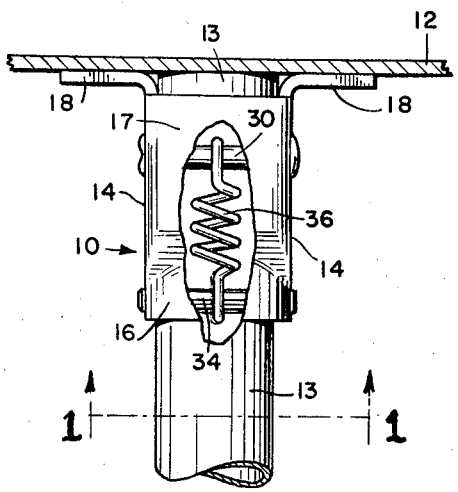
FIG. 2 is an end elevation of the assembly shown in FIG. 1 but with portions thereof being broken away.

As shown, my leg assembly comprises a bracket 10 carried on a plate 12 adapted to be mounted on the underside of a card table, chair, or the like for mounting a leg 13 thereon. Said bracket is provided with a pair of parallel side walls 14 interconnected at one of their ends by an end wall 16 having its upper portion offset outwardly, as at 17. Conveniently, the upper ends of side walls 14 may be continuous with a pair of laterally projecting flanges 18 received against plate 12 for mounting the bracket on said plate. Alternatively, the bracket side walls can be connected directly to said plate so that said plate forms an upper wall on said bracket.

Figure 3:
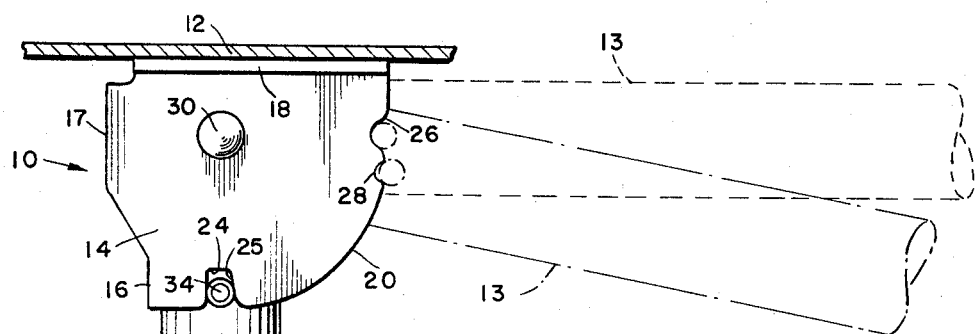
FIG. 3 is a side elevation of the assembly, and showing the leg releasably retained in a plurality of positions of adjustment.
Figure 4:
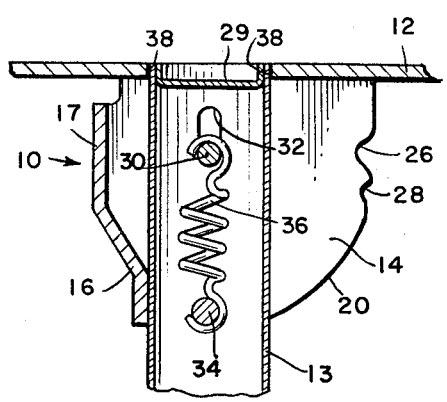
FIG. 4 is a vertical section taken on the line 4—4 of FIG. 1.

As best shown in FIGS. 3 and 4, the ends of the side walls remote from end wall 16 and flange 18 are rounded, as at 20. The ends 20 are provided with a first pair of transversely aligned recesses 24 adjacent the lower end of end wall 16. Conveniently, the faces of recesses 24 remote from end wall 16 are angled, as at 25. A second pair of transversely aligned recesses 26 are formed in the side wall ends 20 adjacent the upper ends of said side walls. In order to permit the legs 13 to be swingable between a vertical operative position and a horizontal retracted position, recesses 24 and 26 are spaced 90° apart around side wall ends 20. Desirably, for reasons that will become more apparent hereinafter, a third pair of transversely aligned recesses 28 are formed in the side wall ends 20 intermediate recesses 24 and 26.

Conveniently, as shown in FIG. 4, leg 13 is formed from a length of metal-tubing and is rigidized at its upper end by plug 29 and is provided with an end cap 31 at its lower end. The upper end of leg 13 is interposed between the bracket side walls 14 and is carried on a pivot pin 30 interconnecting said side walls. Leg 13 has an elongated slot 32 set inwardly from its upper end through which pin 30 extends for thus swingably and slidably mounting the leg on bracket 10. A second pin 34 extends transversely across leg 13 below pin 30 and projects outwardly from the sides of said legs. The pins 30 and 34 are interconnected by a coil spring 36 which thus acts on leg 13 to urge the pin 33 against the side wall ends 20 and into recesses 24, 26, and 28.

As shown in FIG. 4, with leg 13 in its extended operative position, it is interposed between the bracket side walls 14 in abutting relation with the lower portion of end wall 16 and its upper end received in an opening 38 in plate 12. Spring 36 acting on pin 34 causes said pin to be seated in the recesses 24 and the upper end of the leg to be seated in opening 38 for thus releasably locking said leg in its operative position. To move the leg to its retracted position, it is merely necessary to slide the leg outwardly with respect to the bracket 10 to disengage it from opening 38 and disengage pin 34 from recesses 24. Cam faces 25 of recesses 24 help move pin 34 out of said recesses to permit the leg to swing into a different position of adjustment. With pin 34 disengaged from recesses 24, said pin will slide along the side wall edges 20 until it reaches recesses 28, whereupon the leg can again be pulled outwardly to clear said recesses and be swung further upwardly until pin 34 becomes aligned with recesses 26. When pin 34 is aligned with the recesses 26, the spring 36 will pull the pin 34 into said recesses for thus releasably locking the leg in its retracted position. The offset upper portion 17 of end wall 16 permits the extreme upper end of the leg to pivot about the sliding axis of slot 32 and pin 30 during its movements between extended and retracted positions and allows for clearance between the upper end of the leg and the bracket when the leg is in its retracted position. In order to move the leg 13 to its operative position, said leg is merely pulled outwardly and then swung downwardly to clear recesses 26 and 28 until said leg abuts the lower end of end wall 16, whereupon pin 34 will seat in recesses 24 under the action of the spring 36.

As will be understood, the recesses 28 are adapted to receive pin 34 under the action of spring 36 when leg 13 is moved to an intermediate position between its extended and retracted positions. In this intermediate position as illustrated by chain link lines in FIG. 4, the leg will be angled outwardly with respect to the bracket. Locking the leg in this intermediate position of adjustment greatly facilitates the production of the assembly since it maintains the leg in a position such that paint and other coating materials can be easily sprayed into the interstices of the assembly.

I claim:

1. A leg mounting assembly, comprising a base having an opening formed therein, a pair of side walls projecting downwardly from said base having one of their ends interconnected by an end wall and their opposite ends curved and provided with pairs of arcuately spaced recesses, a first pin extending between said side walls, a leg having its upper end swingably and slidably mounted on said first pin, a second pin fixedly mounted on said leg and receivable in said recesses, and a spring interconnecting said first and second pins for urging said leg upwardly on said first pin toward said base and urging said second pin into said recesses whereby said leg is releasably lockable in an extended position with its upper end in said opening and said second pin received in one pair of said recesses and in a retracted position in which said second pin is received in another pair of said recesses.

2. A leg mounting assembly as set forth in claim 1 in which said first pin extends through an elongated slot formed in said leg inwardly from its upper end, and the upper portion of said end wall is offset outwardly adjacent said base and the lower portion of said end wall abuts said leg when the leg is in its extended position.

3. A leg mounting assembly as set forth in claim 1 in which the upper portion of said end wall is offset outwardly adjacent said base, a first pair of said recesses is located adjacent said end wall for reception of said second pin when the upper end of said leg is in said base opening, a second pair of said recesses is located adjacent said base, and a third pair of recesses is located intermediate said first and second pairs of recesses, said second and third pairs of recesses receiving said second pin when the upper end of the leg is in the upper offset portion of said base.

References Cited

UNITED STATES PATENTS

| 1,636,912 | 7/1927 | Johnson | 248—188 X |
| 1,855,857 | 4/1932 | Harman | 287—14 |
| 1,962,126 | 6/1934 | Andersen | 287—14 |
| 2,683,069 | 7/1954 | Kimmel | 287—14 |
| 3,126,189 | 3/1964 | Van Syoc | 248—188 |

FOREIGN PATENTS 581,657  10/1946  Great Britain.

CHANCELLOR E. HARRIS, *Primary Examiner.*